Jan. 24, 1956

A. W. BERNHART 2,732,246

SELF RELEASING HOOK

Filed Sept. 25, 1953

Alv W. Bernhart
INVENTOR.

Jan. 24, 1956 A. W. BERNHART 2,732,246
SELF RELEASING HOOK
Filed Sept. 25, 1953 5 Sheets-Sheet 2

Alv W. Bernhart
INVENTOR.

Jan. 24, 1956 A. W. BERNHART 2,732,246
SELF RELEASING HOOK
Filed Sept. 25, 1953 5 Sheets-Sheet 3
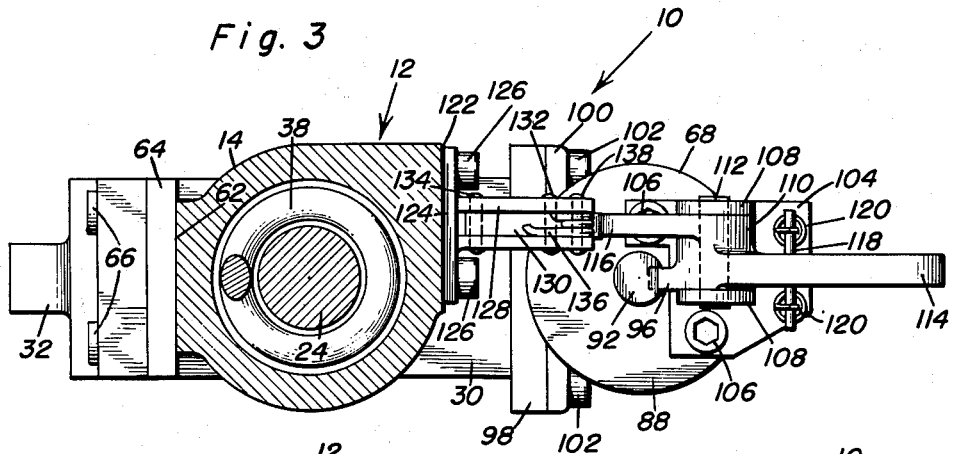
Fig. 3
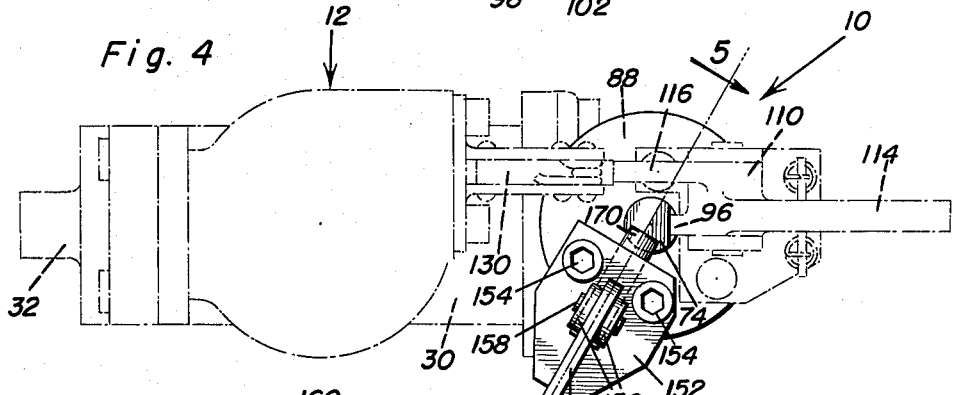
Fig. 4
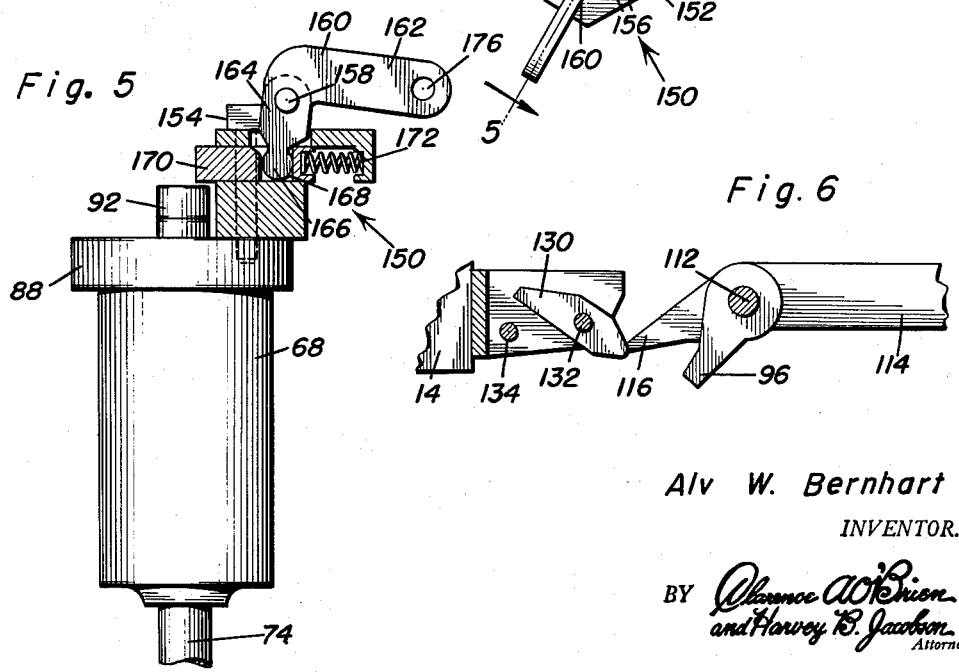
Fig. 5
Fig. 6
Alv W. Bernhart
INVENTOR.
BY Clarence A. O'Brien
and Harvey B. Jackson
Attorneys Jan. 24, 1956

A. W. BERNHART 2,732,246

SELF RELEASING HOOK

Filed Sept. 25, 1953

Alv W. Bernhart
INVENTOR.

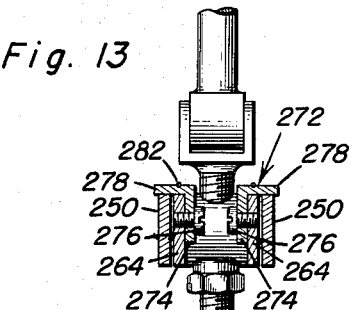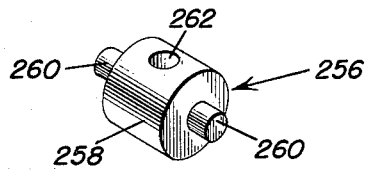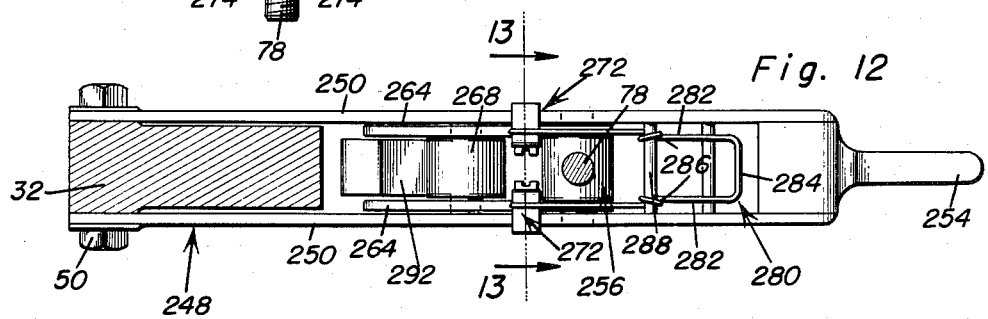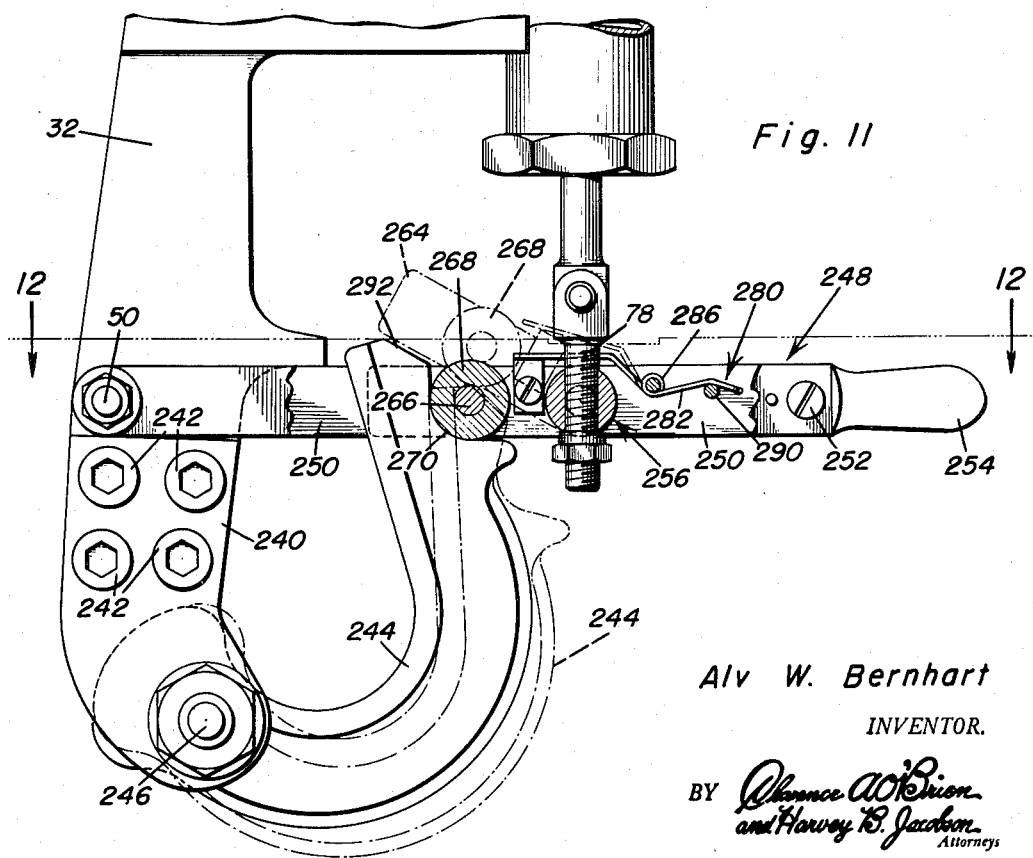

United States Patent Office 2,732,246
Patented Jan. 24, 1956

2,732,246

SELF RELEASING HOOK

Alv W. Bernhart, New Orleans, La., assignor to Higgins, Inc., New Orleans, La., a corporation of Louisiana Application September 25, 1953, Serial No. 382,362

14 Claims. (Cl. 294—83)

This invention relates in general to hooks of a type having pivoted bill portions, and more particularly to a self releasing hook.

The primary object of this invention is to provide an improved self releasing hook of a type which will automatically release a depending load upon the engagement of such load with a supporting surface.

Another object of this invention is to provide an improved latch member releasing mechanism for hooks of the type including pivoted bill portions, the releasing mechanism being actuated in response to the reduction of a load on such bill portions below a predetermined limit.

Another object of this invention is to provide an improved self releasing hook which includes relatively movable shank and yoke portions, the shank portion being provided with releasing mechanism which is controlled by relative movement of the shank with respect to the yoke, the shank being spring urged toward the yoke to cause a releasing action upon reduction of the load on the shank portion below a predetermined limit.

Another object of this invention is to provide an improved self releasing hook which includes a mechanism for releasing a pivoted bill portion of a hook upon the reduction of a load thereon below a predetermined limit, the bill portion also being manually releasable.

A further object of this invention is to provide an improved self releasing hook which includes means for normally retaining a bill portion in a hook forming position, said means being actuated in response to a reduction in load on the bill portion below a predetermined limit, and safety means for normally locking said releasing means, the safety means being manually controllable by an operator of the hook.

A still further object of this invention is to provide an improved self releasing hook which may be utilized with aircraft such as helicopters whereby a load depending from a cable carried thereby will automatically be released upon engagement of such load with the ground or any other supporting surface.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a fragmentary horizontal sectional view taken substantially upon the plane indicated by the section line 3—3 of Figure 2 and shows the general relationship of the hook releasing mechanism;

Figure 4 is a sectional view similar to Figure 3 with the elements of the hook and the releasing mechanism being shown in dotted lines, an alternative safety catch being shown in position;

Figure 5 is an enlarged fragmentary sectional view taken substantially upon the plane indicated by the section line 5—5 of Figure 4 and shows the relationship of the safety catch with respect to releasing mechanism of the hook;

Figure 6 is a fragmentary elevational view of an upper portion of the releasing mechanism and shows the manner in which a tripping member is moved into a tripping position upon the imposition of a load upon the hook;

Figure 10:
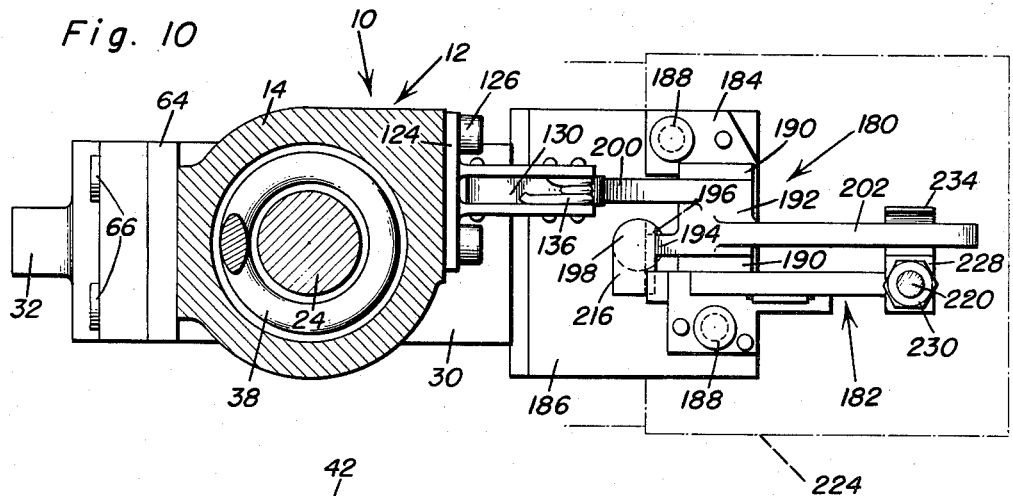
Figure 9:
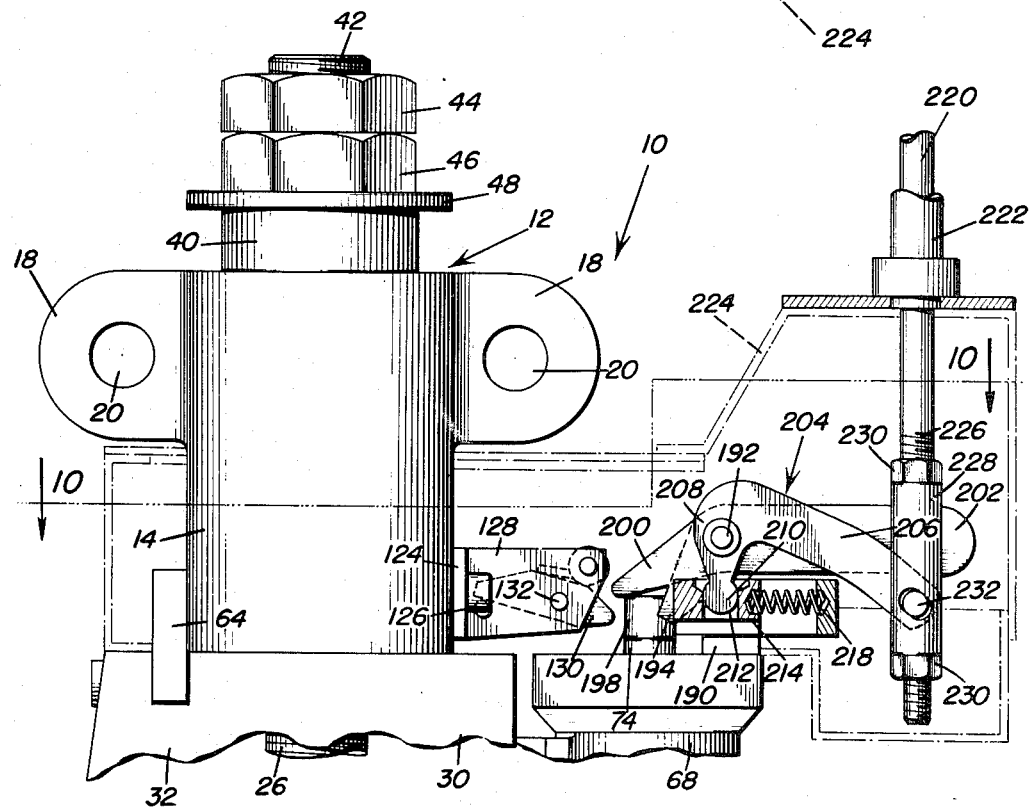
Figure 9 is a fragmentary elevational view of a hook similar to the hook of Figure 1 and shows a modified form of means for controlling operation of the releasing mechanism.

Figure 10 is a fragmentary sectional view taken substantially upon the plane indicated by the section line 10—10 of Figure 9 and shows the relationship of the various elements of the mechanism of Figure 9; and Figure 11 is a fragmentary elevational view on an enlarged scale of the lower portion of the hook and shows a modified form of latch member, the bill portion of the hook and a part of the latch member being shown in dotted lines in an initial bill portion latching position, portions of the latch member being broken away and shown in section in order to clearly illustrate the relationship of the other parts thereof;

Figure 12 is a transverse horizontal sectional view taken substantially upon the plane indicated by the section line 12—12 in Figure 11 and shows the manner in which a bill portion engaging roller is pivotally mounted;

Figure 13 is a transverse sectional view taken substantially upon the plane indicated by the section line 13—13 of Figure 12 and shows the manner in which the mounting means for the roller are pivotally attached; and Figure 14 is a perspective view of a pivot pin for mounting the roller.

Referring now to Figures 2 through 8, inclusive, of the drawings, it will be seen that there is illustrated a preferred form of self releasing hok which is referred to in general by the reference numeral 10. The hook 10 includes a yoke which is referred to in general by the reference numeral 12. The yoke 12 includes a sleeve portion 14 which terminates in a bottom wall 16. Carried by the sleeve portion 14 in diametrically opposed relation is a pair of ears 18 having apertures 20 therethrough, the apertures intending to receive lower ends of a bail or other supporting device.

Extending through the sleeve portion 14 and a centrally located opening 22 in the bottom wall 16 is a bolt 24. The bolt 24 has an externally threaded lower end 26 which is threadedly engaged in an internally threaded bore 28 in an upper portion 30 of a shank portion 32 of a conventional pivoting hook. Pivotally connected to the shank portion 32 by a transverse fastener 34 is a bill portion 36.

Disposed within the sleeve portion 14 and seated on the bottom wall 16 is a coil spring 38. The coil spring 38 surrounds the bolt 24 and has the upper end thereof compressingly engaged by an enlarged shoulder portion 40 of the bolt 24. The shoulder portion 40 is of a diameter to slidably be received within the sleeve portion 14 and forms a guide for the bolt 24. The upper end of the bolt 24 is also externally threaded as at 42 and has adjustably secured thereon nuts 44 and 46, the nut 44 forming a locking nut for the nut 46. The nut 46 retains an enlarged washer 48 on the upper portion 42 of the bolt 24. It will be noted that the washer 48 is of a greater diameter than the shoulder portion 40 and is intended to engage the upper surface of the yoke 12 to form a stop for the yoke 12.

Pivotally carried to the shank portion 32 intermediate its end by a pivot pin 50 is a latch member 52. The latch member 52 is provided intermediate its end with a roller 54 engageable with a cam surface 56 on the upper part of the bill portion 36 to retain the bill portion in a hook forming position. The latch member 52 is provided at its free end with a handle 58 to facilitate manual operation of the same. The shank portion 32 is also provided with a shoulder 60 adjacent the pivot bolt 50 to limit downward movement of the latch member 52. It will be understood that the shank portion 32, the bill portion 36 and the latch member 52 are conventional parts of a type of hook which is old and well known and the general operation of these parts need not be explained in more detail.

Figure 2:
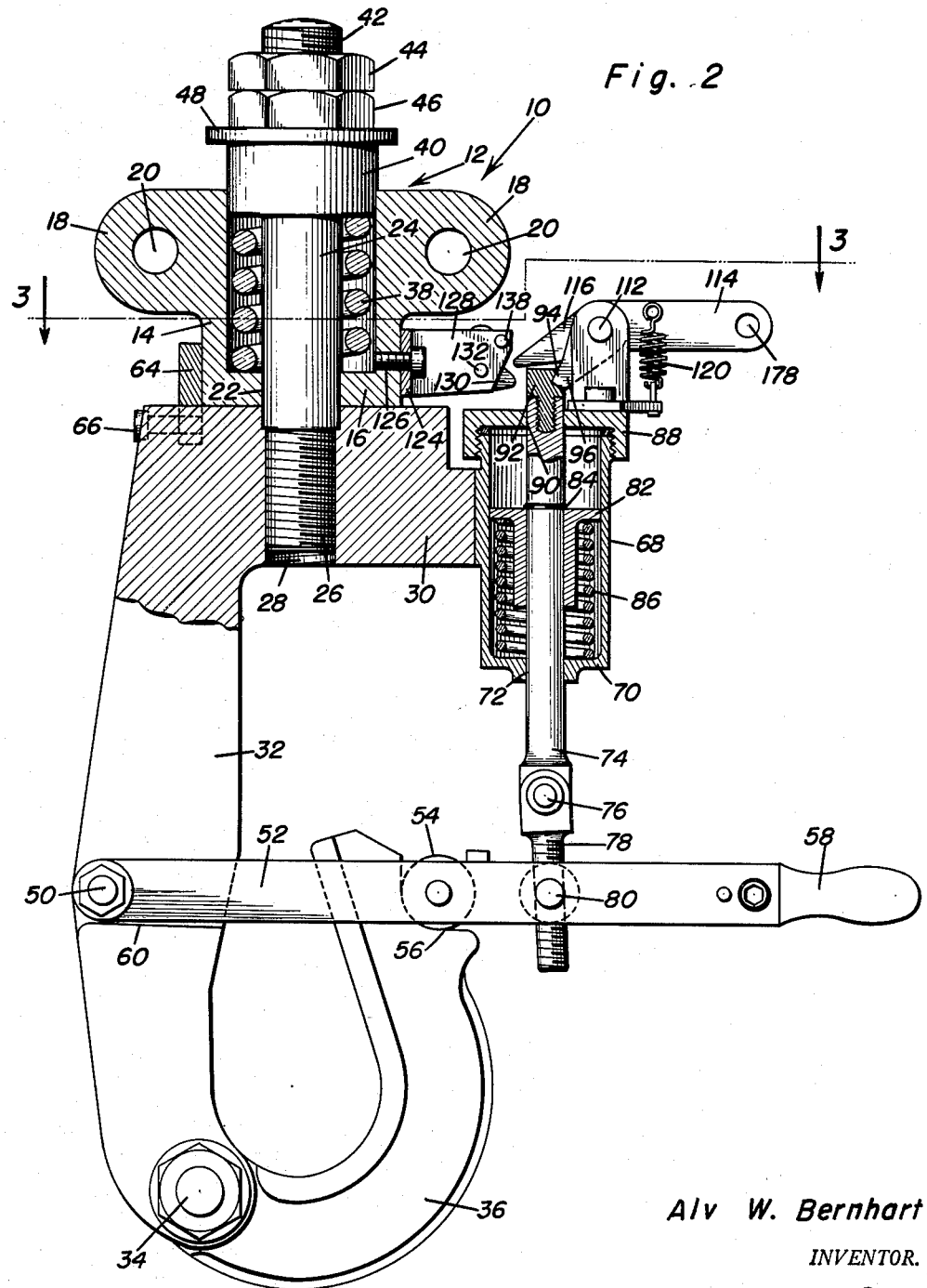
Figure 2 is an enlarged elevational view of the self releasing hook of Figure 1, portions of the hook being broken away and shown in section in order to clearly illustrate the details thereof, the hook being in an initial load receiving position.

As is best illustrated in Figures 2 and 3, the lower part of the yoke 12 is provided with a flat outer surface 62. The surface 62 has secured thereagainst a plate 64 by fasteners 66. The fasteners 66 are carried by the upper end of the shank portion 32 in which the plate 64 is partially recessed. It will be understood that the plate 64 engages the flat surface 62 of the yoke 12 to prevent rotation thereof with respect to the shank portion 32.

Carried by the upper part of the shank portion 32 of the hook 10 is a cylinder 68. The cylinder 68 is provided with a bottom wall 70 having a bore 72 therethrough. Passing through the bore 72 is an actuating arm 74, the actuating arm 74 being pivotally connected as at 76 to an adjustable link 78 pivotally and adjustably connected to the latch member 52 as at 80.

Mounted on the actuating arm 74 within the confines of the cylinder 68 is a shoulder forming member 82, the shoulder forming member 82 is restrained against upward movement by a locking ring 84 mounted on the actuating arm 74. Disposed within the cylinder 68 between the shoulder forming member 82 and the bottom wall 70 is a coil spring 86. The coil spring 86 normally urges the actuating arm 74 upwardly to move the latch member 52 to a hook releasing position.

Removably carried by the upper end of the cylinder 68 is a cap 88. The cap 88 has an aperture 90 through which passes the upper end of the actuating arm 74. The upper end of the actuating arm 74 is in the form of a movable extension 92. The extension 92 is provided with a notch 94 in which is normally seated a dog 96, the dog 96 restraining the actuating arm 74 against upward movement due to the upward urgence of the coil spring 86.

Referring now to Figure 3 in particular, it will be seen that the shank portion has a part 30 thereof provided with an enlarged mounting flange 98 at the free end thereof. The mounting flange 98 has removably secured thereto a mounting flange 100 by fasteners 102. The mounting flange 100 is a part of the cylinder 68 and facilitates the securement thereof to the shank portion 32.

Carried by the cap 88 is a plate 104, the plate being secured to the cap 88 by spaced fasteners 106. The plate 104 is provided with a pair of upstanding, spaced ears 108 which have mounted therebetween a sleeve portion 110, the sleeve portion 110 being carried by a pivot pin 112 extending between the ears 108.

The dog 96 is formed integrally with the sleeve portion 110 and is selectively actuated either by a lever arm 114 extending outwardly from the yoke 12 or by a finger 116 extending inwardly toward the yoke 12. The arm 114 is retained in place by a transverse pin 118 which has connected thereto coil springs 120 disposed on opposite sides of the arm 114. The coil springs 120 have their lower ends secured to the plate 104. The lower part of the yoke 12 is provided with a second flat surface 122 which is disposed opposite from the flat surface 62. Removably secured to the flat surface 122 is a mounting plate 124, fasteners 126 securing the mounting plate 124 in position. The mounting plate 124 is provided with a pair of outwardly extending, spaced parallel ears 128.

Pivotally mounted between the ears 128 is a finger 130, the finger being mounted on a transversely extending pivot pin 132. The finger 130 has an inner end thereof overlying and engaging a stop 134. Overlying an intermediate portion of the finger 130 is one arm of a spring 136 which is carried by a transverse pin 138, the pin 138 being disposed outwardly of the pivot pin 132 and carried by the ears 128. It will be understood that the spring 136 retains the inner end of the finger 130 in engagement with the stop 134.

Referring now to Figure 2 in particular, it will be seen that the releasing mechanism for the latch member 52 is in a locked position. The releasing mechanism which includes the actuating arm 74 is automatically set by downward movement of the latch member 52 through the use of the handle 58 to the bill portion locking position. Inasmuch as the dog 96 is spring urged to a locking position, it will be seen that the dog is automatically set upon downward movement of the actuating arm 74 to the position illustrated in Figure 2.

When a load is placed on the hook 10, the shank portion 32 and the bill portion 36 are moved downwardly with respect to the yoke 12 compressing the spring 38. This results in downward movement of the finger 116 relative to the finger 130 with the finger 116 tripping the finger 130 to permit passage of the finger 116 thereby, as is best illustrated in Figure 6. After the finger 116 has passed by the finger 130, the finger 130 is once again returned to its normal position due to the urgence of the spring 136, the normal position being illustrated in Figure 7.

Figure 1:
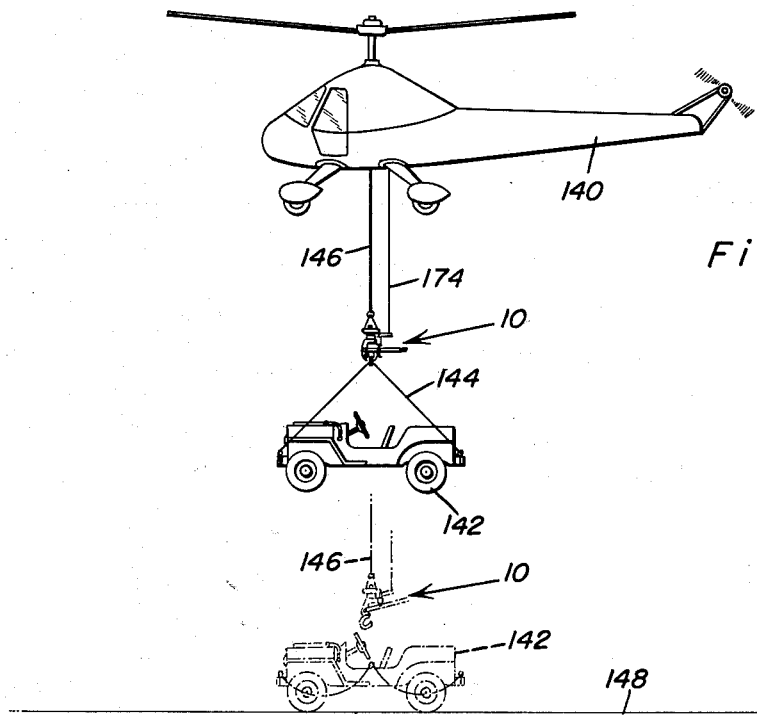
Figure 1 is an elevational view showing the self releasing hook which is the subject of this invention being carried by a helicopter and supporting a load, a releasing position of the hook being shown in dotted lines with the load being disposed on a supporting surface.
Figure 7:
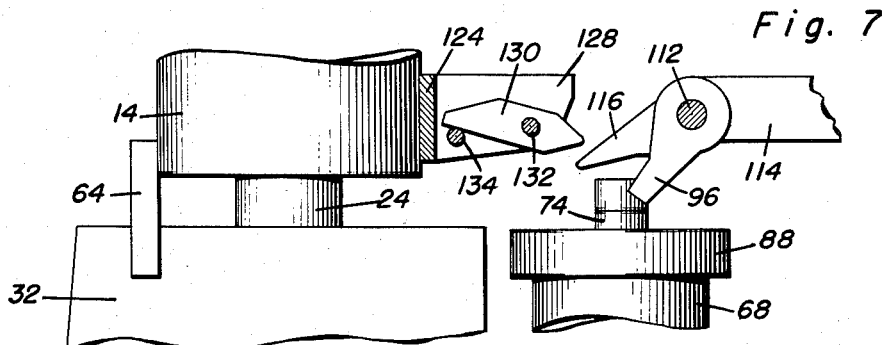
Figure 7 is a fragmentary elevational view similar to Figure 6 and shows the tripping mechanism in an operative position.
Figure 8:
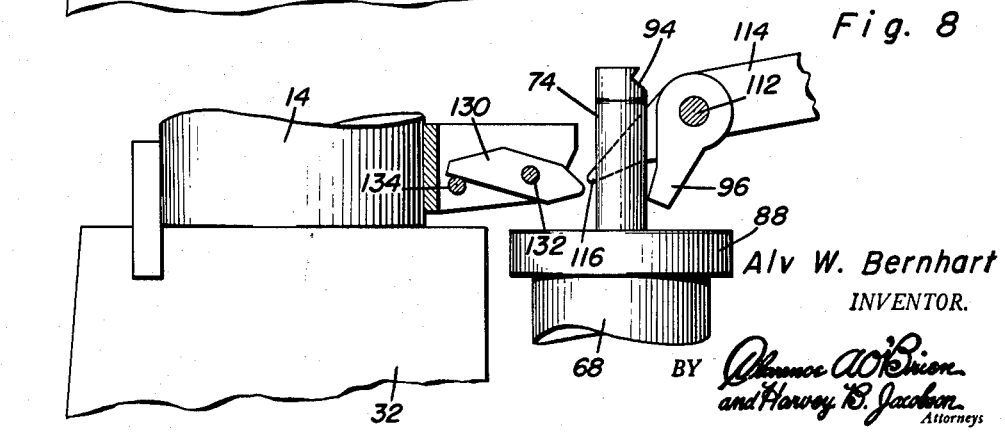
Figure 8 is an elevational view similar to Figure 6 and shows the hook releasing mechanism after being released by the tripping mechanism.

Referring now to Figure 1 in particular, it will be seen that there is illustrated an aircraft in the form of a helicopter 140 which has suspended therefrom a vehicle 142. The vehicle 142 is carried by a sling 144 which is connected to the hook 10, the hook 10 being suspended from the helicopter 140 by a lifting cable 146. When the helicopter 140 moves downwardly to the position where the vehicle 142 engages the ground 148, the load on the bill portion 36 of the hook 10 is at least momentarily released. This permits the spring 38 to urge the bolt 24 and the shank portion 32 upwardly. Upward movement of the shank portion 32 with respect to yoke 12 results in the finger 130 tripping the finger 116 in the manner best illustrated in Figure 8. The downward tripping of the inner end of the finger 116 results in the dog 96 pivoting in a counter-clockwise direction out of engagement with the notch 94. This permits releasing of the actuating arm 74 which is being urged upwardly by the spring 86. Upward movement of the actuating arm 74 results in upward movement of the latch member 52 so that the bill portion 36 is released and the sling 144 also released. The helicopter 140 may then continue in its flight with the vehicle 142 being positioned on the ground 148.

Referring now to Figures 4 and 5 in particular, it will be seen that the hook 10 has been provided with a safety which is referred to in general by the reference numeral 150. The safety 150 includes a mounting plate 152 which is secured to the cap 88 by fasteners 154. The mounting plate 152 is provided with a pair of spaced ears 156 which have extended therebetween a pivot pin 158. Carried by the pivot pin 158 between the ears 156 is an L-shaped member 160. The L-shaped member 160 includes a horizontal arm 162 and a vertical arm 164. The vertical arm 164 has a spherical lower end 166 which is engaged in a socket 168 in the latch pin 170. The latch pin 170 is slidably retained in the mounting plate 152 and is urged toward the actuating arm 74 by a spring 172.

It will be noted that the pin 170 normally overlies the upper end of the actutaing arm 74. Due to the relative position of the pin 170 with respect to the upper end of the actuating arm 74, it will be seen that in the event the finger 116 is accidentally tripped due to the bouncing of the load such as the vehicle 142, the actuating arm 74 will not be released. In this manner the dog 96 will be retained in its normal position until it is desired to release the load carried by the hook 10. In the case of the helicopter 140, the same is provided with a tripping line 174 which is passed through an aperture 176 in the horizontal portion 162 of the L-shaped member 160. When it is desired to release the vehicle 142, the helicopter 140 is moved down toward the vehicle unloading position. When the jeep is a few feet off the ground, the tripping line 174 is pulled. Then as soon as the vehicle 142 touches the ground 148, the releasing mechanism of the hook 10 is actuated to permit the bill portion 36 to swing to an open position.

Referring now to Figure 2 of the drawings in particular, it will be seen that the lever arm 114 is provided with an aperture 178 adjacent at that end. The aperture 178 may have passed therethrough a manual trip rope (not shown) which may also be connected to the helicopter 140. The manual trip rope may then be utilized to manually trip the releasing mechanism for the hook 10 so that the dog 96 may be moved out of engagement with the notch 94 to permit upward movement of the actuating arm 74. In this manner the load carried by the helicopter 140 may be dropped from a height if so desired. For example, in the case of storms and the like it may be necessary to jettison the load being carried by the helicopter. It is highly undesirable for the helicopter to come sufficiently close to land so that the load may be released in the normal manner. Thus the arm 114 is utilized in the jettison of cargo and the like.

Referring now to Figures 9 and 10 in particular, it will be seen that the self releasing hook 10 is provided with a modified form of locking mechanism for the actuating arm 74, the locking mechanism being referred to in general by the reference numeral 180. Also, there is provided a modified form of safety catch which is referred to in general by the reference numeral 182.

The locking mechanism 180 is quite similar to that illustrated in Figures 2 through 8 inclusive, inasmuch as it includes a mounting plate 184 secured to a slightly modified form of cap 186 by suitable fasteners 188. The mounting plate 184 has extending upwardly therefrom a pair of spaced ears 190. Extending between the ears 190 is a pivot pin 192. Mounted on the pivot pin 192 for pivotal movement is a sleeve portion 200. The sleeve portion 200 has formed integrally therewith an inwardly extending dog 194 which is engaged in a notch 196 in a modified form of extension 198 for the actuating arm 74. Also formed integrally with the sleeve portion 200 is an inwardly extending finger 200 which is engageable with the tripping finger 130 in the same manner described above with respect to the finger 116. The sleeve portion 200 is also provided with an outwardly extending lever arm 202.

Also pivotally carried by the pivot pin 192 is an L-shaped member which is referred to in general by the reference numeral 204. The L-shaped member 204 forms a part of the safety catch 182 and includes a generally horizontal arm 206 and a vertical arm 208. The vertical arm 208 terminates in a spherical lower end 210 which is seated in a socket 212 in a lock pin 214. It will be noted that the extension 198 is provided with a transversely extending portion 216 which is in alignment with the associated end of the lock pin 214. The notch 196 extends through the portion 216 and the associated end of the lock pin 214 is normally seated therein, the lock pin 214 being urged into position by a spring 218. It will be understood that the lock pin 214 and the spring 218 are carried by upwardly projecting portions of the mounting plate 184.

The lock mechanism 180 and the safety catch 182 may be actuated in the same manner described above relative to the corresponding parts of the hook previously described. However, if so desired, the horizontal arm 206 and the lever arm 202 may be controlled by a single actuating rod 220. The actuating rod 220 is slidably mounted in a sleeve 222 carried by a housing 224, the housing 224 being carried by the yoke 12. The actuating rod 220 extends downwardly into the housing 224 and is provided with an externally threaded lower portion 226. Adjustably carried on the lower portion of the actuating rod 220 is a connector 228, the connector 228 being positioned by nuts 230 selectively positioned on the externally threaded lower portion 226. The connector 228 is connected directly to the horizontal arm 206 by a pin 232. The connector 228 also includes a lower hook portion 234 which underlies the lever arm 202. It will be understood that the hook portion 234 is spaced below the lever arm 202.

In operation, the actuating rod 220 may be moved up slightly to release the safety catch 182. Then, if desired, the self releasing hook may be operated automatically in the manner described above. However, if it is desired to either manually release the load carried by the hook 10 in the normal manner or to jettison such a load, the actuating rod 220 may be moved further vertically with the result that the hook portion 234 will engage the lever arm 202 to release the upper end of the actuating rod 74 by moving the dog 194 out of engagement with the notch 196.

From the foregoing, it will be seen that the modification illustrated in Figures 9 and 10 may be applied to the hook 10 with a minimum effort by merely replacing the cap 88 with the cap 186, the cap 186 carrying all of the necessary replacement elements.

Referring now to Figures 11 through 14, inclusive, it will be seen that there is illustrated a modified form of latch member for retaining the bill portion of the hook in position. The shank portion 32 of the hook is modified to have a pair of removable plates 240 secured to the lower end thereof in spaced relation by suitable fasteners 242. Pivotally connected to the plates 240 and disposed therebetween is one end of a bill portion 244. The bill portion 244 is connected to the plates 240 by a transverse pivot pin 246. It will be noted that the bill portion 244 is substantially identical to the bill portion 36 and if so desired may be connected to the shank 32 in the same manner as the bill portion 36.

Pivotally connected to the shank portion 32 by the pivot pin 50 is a modified form of latch member which is referred to in general by the reference numeral 248. The latch member 248 is formed of a pair of spaced parallel bars 250 which are connected at one end to the shank portion 32 by the pivot pin 50 and at the other end by a fastener 252, the fastener 252 connecting the bars 250 to a handle 254.

Referring now to Figure 14 in particular, it will be seen that there is illustrated a modified form of pivot pin which is referred to in general by the reference numeral 256. The pivot pin 256 includes an enlarged cylindrical body portion 258 which has extending outwardly from the ends thereof in concentric relation to its axis a pair of pin elements 260. The body member 258 is also provided with a transversely extending bore 262.

The pivot pin 256 is carried by the bars 250 with the body portion 258 disposed therebetween and the pin portions 260 pivotally mounted in suitable bores through the bars 250, the bores being in transverse alignment. The pivot pin 256 is disposed in alignment with the adjustable link 78 and the adjustable link 78 is passed through the bore 262 thereof.

It will be understood that the length of the body portion 258 is less than that of the spacing between the bars 250. Pivotally mounted on the pin portions 260 and extending toward the shank 32 is a pair of flat strips 264. The flat strips 264 have portions thereof disposed between the body portion 258 and the inner faces of the bars 250 and are disposed in spaced parallel relation with respect to the bars 250.

Carried by the straps 264 remote from the pivot pin 256 is a pivot pin 266. The pivot pin 266 has mounted thereon for rotation a roller 268. The roller 268 is selectively engageable with a cam surface 270 of the bill portion 244 to retain the bill portion 244 in a hook forming position.

Disposed intermediate the roller 268 and the pivot pin 256 is a pair of annular cross sectional members 272. Each of the annular cross sectional members 272 includes a vertical flange 274 which is disposed between the strips 264 and which is secured to the inner surface of an associated strip 264 by a fastener 276. The members 274 also include horizontal flanges 278 which overlie both their respective strips 264 and associated ones of the bars 250. The horizontal flanges 278 limit downward movement of the strips 264 and the roller 268 to prevent accidental disengagement of the roller 268 from the cam surface 270.

In order to insure normal engagement of the horizontal flanges 278 with the upper edges of the strips 264 and the bars 250, there is provided a spring member 280. The spring member 280 includes a pair of legs 282 which are connected together by a bight portion 284. Each of the legs 282 is provided intermediate its ends with a loop 286 through which is received a transverse pin 288. The pin 288 is carried by the bars 250 and disposed on the handle side of the pivot pin 256. The free ends of the legs 282 are disposed on opposite sides of the adjustable link 78 and engage the upper surfaces of the horizontal flanges 278 to urge the strips 264 downwardly to their horizontal positions. The ends of the legs 282 adjacent the bight portion 284 overlie a transverse pin 290 carried by the bars 250 to cause the free ends of the legs 282 to be urged downwardly, the legs 282 pivoting about the bar 288.

Referring now to Figure 11 in particular, it will be seen that the free end part of the bill portion 244 is provided with a flat cam surface 292. The cam surface 292 is engageable with the roller 268 to urge it upwardly into the dotted line position. This permits the free end part of the bill portion 244 to pass beneath the roller 268 and the roller to move into engagement with the cam surface 270.

At times it is desired to first lock the latch mechanism for the latch member 248. After the latch mechanism has been locked, the latch member 248 should not be disturbed during the movement of the bill portion 244 to a hook forming position. Thus, the sling (not shown) is passed over the bill portion 244 and the bill portion moved outwardly to its dotted line position. Then by further upward pressure on the bill portion 244 sufficient to overcome the downward urgence of the spring 280, the roller 268 could be temporarily displaced so as to slide over the cam surface 292 and engage the cam surface 270. The bill portion 244 is then locked in its hook forming position.

Although the latch member 248 has been described independently of the remainder of the hook which is the subject of this invention, it will be understood that it may be a part of the hooks previously described. Further, if desired, only the latch member 52 of the hook 10 need be replaced by the latch member 248.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A self releasing hook of the type having a normally vertical shank portion and an upstanding pivoted bill portion, said hook including a latch member pivotally carried by said shank portion for retaining said bill portion in a hook forming position, means for retaining said latch member in an operative position, said means being released upon the reduction of a load on said bill portion to predetermined limits, a safety catch connected to said means remote from said latch member for selectively rendering the same non-releasable.

2. A self releasing hook of the type having a vertical shank portion and a pivoted bill portion, said hook including a latch member carried by said shank portion for retaining said bill portion in a hook forming position, means for retaining said latch member in an operative position, said means being released upon the reduction of a load on said bill portion to predetermined limits, said means including an actuating arm connected to said latch member for moving the same to a released position, said actuating arm being normally urged to a releasing position, means restraining said actuating arm against movement.

3. A self releasing hook of the type having a vertical shank portion and a pivoted bill portion, said hook including a latch member carried by said shank portion for retaining said bill portion in a hook forming position, means for retaining said latch member in an operative position, said shank portion being slidably carried by a yoke, resilient means carried by said yoke normally urging said shank portion toward an upper position, said first mentioned means including cooperating elements carried by said yoke and said shank portion, said means being released upon the reduction of a load on said bill portion to predetermined limits.

4. A self releasing hook of the type having a vertical shank portion and a pivoted bill portion, said hook including a latch member carried by said shank portion for retaining said bill portion in a hook forming position, means for retaining said latch member in an operative position, a yoke, said shank portion being slidably carried by said yoke, resilient means carried by said yoke normally urging said shank portion to an upper position, said first mentioned means including a latch member actuating arm, a dog retaining said actuating arm in an inoperative position, means carried by said yoke for tripping said dog upon reduction of a load on said shank portion below a present limit.

5. A self releasing hook of the type having a vertical shank portion and a pivoted bill portion, said hook including a latch member carried by said shank portion for retaining said bill portion in a hook forming position, means for retaining said latch member in an operative position, a yoke, said shank portion being slidably carried by said yoke, resilient means carried by said yoke normally urging said shank portion to an upper position, said first mentioned means including a latch member actuating arm, a dog retaining said actuating arm in an inoperative position, means carried by said yoke for tripping said dog upon reduction of a load on said shank portion below a present limit, said dog being self setting.

6. A self releasing hook of the type having a vertical shank portion and a pivoted bill portion, said hook including a latch member carried by said shank portion for retaining said bill portion in a hook forming position, means for retaining said latch member in an operative position, a yoke, said shank portion being slidably carried by said yoke, resilient means carried by said yoke normally urging said shank portion to an upper position, said first mentioned means including a latch member actuating arm, a dog retaining said actuating arm in an inoperative position, means carried by said yoke for tripping said dog upon reduction of a load on said shank portion below a present limit, said last mentioned means being operative in one direction only.

7. A self releasing hook of the type having a vertical shank portion and a pivoted bill portion, said hook including a latch member carried by said shank portion for retaining said bill portion in a hook forming position, means for retaining said latch member in an operative position, a yoke, said shank portion being slidably carried by said yoke, resilient means carried by said yoke normally urging said shank portion to an upper position, said first mentioned means including a latch member actuating arm, a dog retaining said actuating arm in an inoperative position, means carried by said yoke for tripping said dog upon reduction of a load on said shank portion below a present limit, a safety catch engaging said actuating arm to render release of said dog ineffective.

8. A self releasing hook of the type having a vertical shank portion and a pivoted bill portion, said hook including a latch member carried by said shank portion for retaining said bill portion in a hook forming position, means for retaining said latch member in an operative position, a yoke, said shank portion being slidably carried by said yoke, resilient means carried by said yoke normally urging said shank portion to an upper position, said first mentioned means including a latch member actuating arm, a dog retaining said actuating arm in an inoperative position, means carried by said yoke for tripping said dog upon reduction of a load on said shank portion below a present limit, said safety catch being self setting.

9. A self releasing hook of the type having a vertical shank portion and a pivoted bill portion, said hook including a latch member carried by said shank portion for retaining said bill portion in a hook forming position, means for retaining said latch member in an operative position, a yoke, said shank portion being slidably carried by said yoke, resilient means carried by said yoke normally urging said shank portion to an upper position, said first mentioned means including a latch member actuating arm, a dog retaining said actuating arm in an inoperative position, means carried by said yoke for tripping said dog upon reduction of a load on said shank portion below a present limit, said actuating arm being spring urged to a latch member releasing position.

10. A self releasing hook of the type having a vertical shank portion and a pivoted bill portion, said hook including a latch member carried by said shank portion for retaining said bill portion in a hook forming position, means for retaining said latch member in an operative position, a yoke, said shank portion being slidably carried by said yoke, resilient means carried by said yoke normally urging said shank portion to an upper position, said first mentioned means including a latch member actuating arm, a dog retaining said actuating arm in an inoperative position, means carried by said yoke for tripping said dog upon reduction of a load on said shank portion below a present limit, a safety catch engaging said actuating arm to render release of said dog ineffective, said first mentioned means and said catch member being manually releasable.

11. A self releasing hook of the type having a vertical shank portion and a pivoted bill portion, said hook including a latch member carried by said shank portion for retaining said bill portion in a hook forming position, means for retaining said latch member in an operative position, a yoke, said shank portion being slidably carried by said yoke, resilient means carried by said yoke normally urging said shank portion to an upper position, said first mentioned means including a latch member actuating arm, a dog retaining said actuating arm in an inoperative position, means carried by said yoke for tripping said dog upon reduction of a load on said shank portion below a present limit, a safety catch engaging said actuating arm to render release of said dog ineffective, manually controlled means for selectively releasing said first mentioned means and said catch member.

12. A self releasing hook of the type having a vertical shank portion and a pivoted bill portion, said hook including a latch member carried by said shank portion for retaining said bill portion in a hook forming position, means for retaining said latch member in an operative position, a yoke, said shank portion being slidably carried by said yoke, resilient means carried by said yoke normally urging said shank portion to an upper position, said first mentioned means including a latch member actuating arm, a dog retaining said actuating arm in an inoperative position, means carried by said yoke for tripping said dog upon reduction of a load on said shank portion below a present limit, a safety catch engaging said actuating arm to render release of said dog ineffective, manually controlled means for selectively releasing said first mentioned means and said catch member, said manually controlled means including a lost motion connection whereby said safety catch may be first released.

13. A self releasing hook of the type having a vertical shank portion and a pivoted bill portion, said hook including a latch member carried by said shank portion for retaining said bill portion in a hook forming position, means for retaining said latch member in an operative position, said means being released upon the reduction of a load on said bill portion to predetermined limits, said latch member including a roller engageable with said bill portion to retain said bill portion in a hook forming position, said roller being pivotally mounted to permit movement of said bill portion to a hook forming position when said means are in operative position.

14. A self releasing hook of the type having a vertical shank portion and a pivoted bill portion, said hook including a latch member carried by said shank portion for retaining said bill portion in a hook forming position, means for retaining said latch member in an operative position, said means being released upon the reduction of a load on said bill portion to predetermined limits, said latch member including a roller engageable with said bill portion to retain said bill portion in a hook forming position, said roller being pivotally mounted to permit movement of said bill portion to a hook forming position when said means are in operative position, said roller being normally urged to a bill portion locking position.

References Cited in the file of this patent

UNITED STATES PATENTS

| | | |
|---|---|---|
| 2,478,019 | Sonntag | Aug. 2, 1949 |
| 2,490,558 | Sullivan | Dec. 6, 1949 |
| 2,502,097 | Linder | Mar. 28, 1950 |
| 2,534,704 | Frieder et al. | Dec. 19, 1950 |
| 2,582,990 | Hattan | Jan. 22, 1952 |
| 2,616,748 | Hight | Nov. 4, 1952 |
| 2,667,376 | Schlachter | Jan. 29, 1954 |

FOREIGN PATENTS

| | | |
|---|---|---|
| 143,348 | Great Britain | May 27, 1920 |